J. C. PHELPS.
ATTACHMENT FOR CONDUIT OUTLET BOXES.
APPLICATION FILED APR. 11, 1912.
1,117,084.
Patented Nov. 10, 1914.
3 SHEETS—SHEET 1.
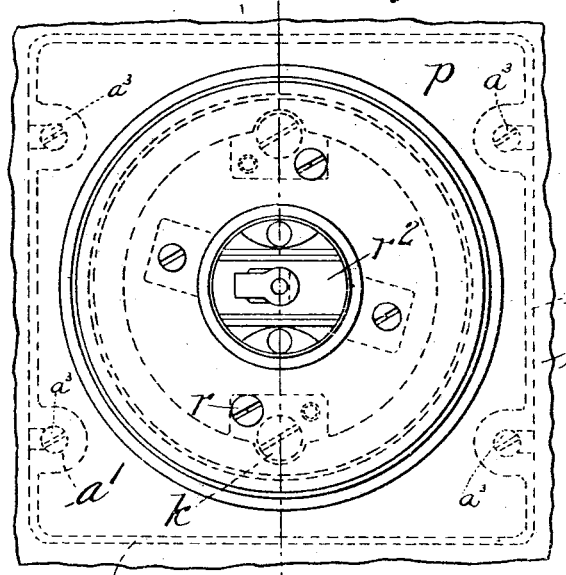
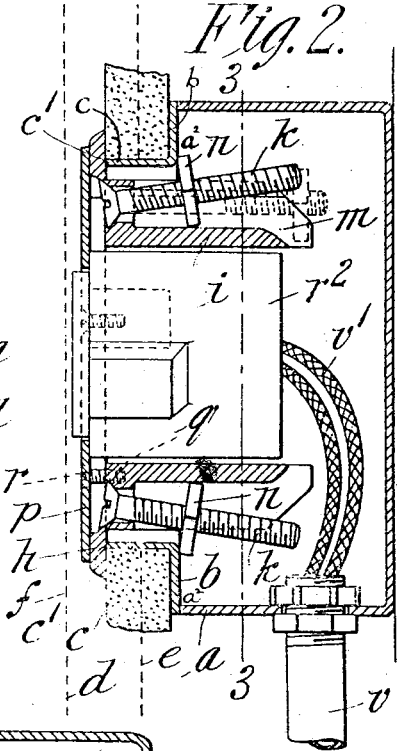
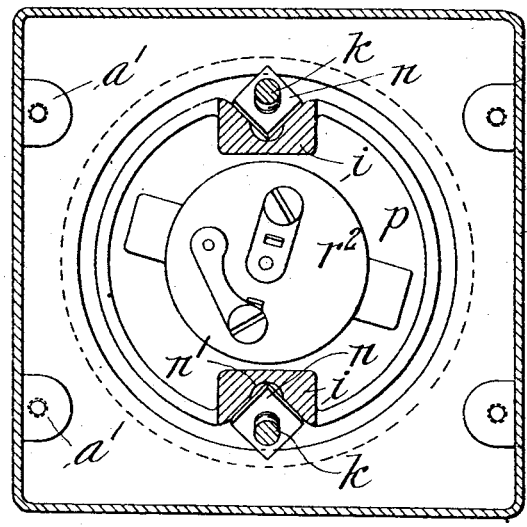
WITNESSES:
INVENTOR,
James C. Phelps,
BY
ATTORNEY.

J. C. PHELPS.
ATTACHMENT FOR CONDUIT OUTLET BOXES.
APPLICATION FILED APR. 11, 1912.

1,117,084.
Patented Nov. 10, 1914.
3 SHEETS—SHEET 2.

WITNESSES:

INVENTOR,
James C. Phelps,
BY
Chapin Neg.
ATTORNEY.

J. C. PHELPS.
ATTACHMENT FOR CONDUIT OUTLET BOXES.
APPLICATION FILED APR. 11, 1912.

1,117,084.

Patented Nov. 10, 1914.

3 SHEETS—SHEET 3.

WITNESSES:
K. D. Clemons
R. M. Mowry

INVENTOR,
James C. Phelps,
BY Chapin & Co.
ATTORNEY

UNITED STATES PATENT OFFICE.

JAMES C. PHELPS, OF SPRINGFIELD, MASSACHUSETTS.

ATTACHMENT FOR CONDUIT OUTLET-BOXES.

1,117,084.         Specification of Letters Patent.         Patented Nov. 10, 1914.

Application filed April 11, 1912. Serial No. 690,024.

*To all whom it may concern:*

Be it known that I, JAMES C. PHELPS, a citizen of the United States of America, residing at Springfield, in the county of Hampden and State of Massachusetts, have invented new and useful Improvements in Attachments for Conduit Outlet-Boxes, of which the following is a specification.

This invention relates to improvements in junction or outlet boxes for electric wiring and is particularly designed to be used in making connections where the box, or the edge thereof, does not extend out flush or even with the surface of the plastering, as sometimes happens where in setting these boxes either a thick or thin coating of the plastering is applied about the box, so that when the electric connections are made it is often necessary to remove or build up around the box in order to produce a neat finished appearance.

A further object of the invention is to permit electrical attachments of various kinds to be made in connection with the outlet box, i. e. if it is desired to connect a cord which carries an electric light, either pendant or stationary, or to connect a conduit pipe through which wires are drawn, it can be readily accomplished with this improvement.

The invention consists in general, of an extension piece formed with grooved depending portions that are adapted to be inserted into the neck of the outlet box, and to this extension piece are attached or secured the various connections required in electric wiring.

Figure 4:
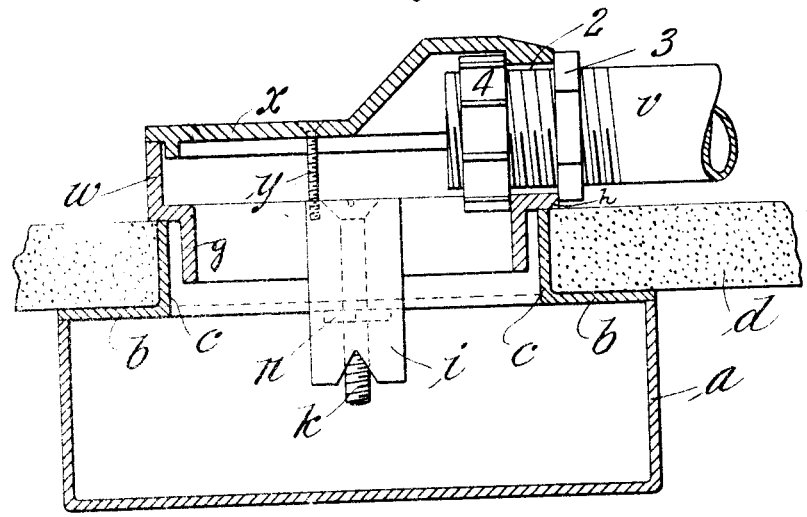
Figure 5:
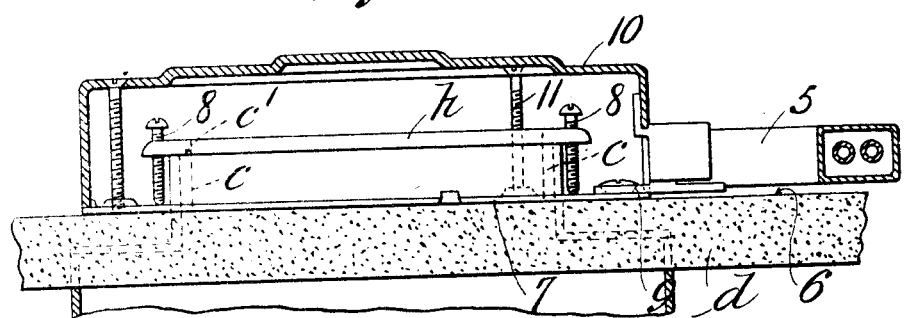
Figure 6:
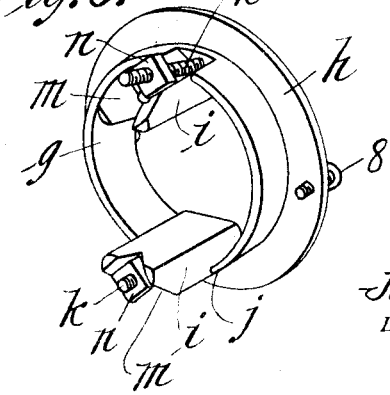
Figure 7:
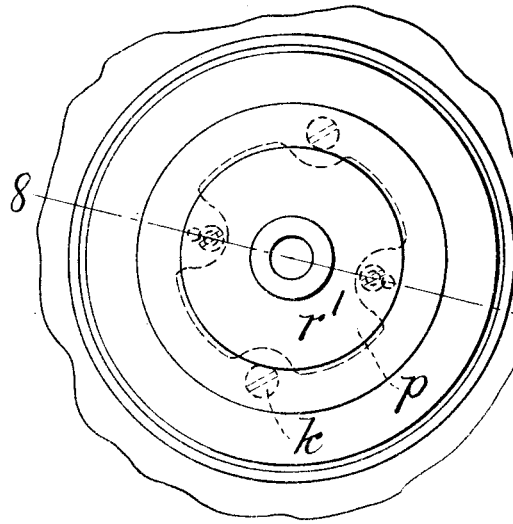
Figure 8:
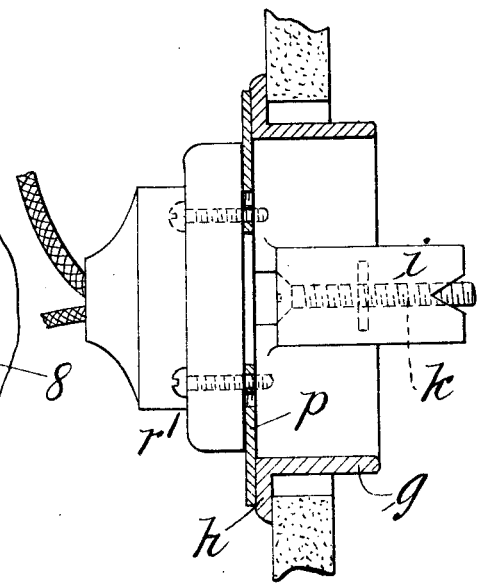
Figure 9:
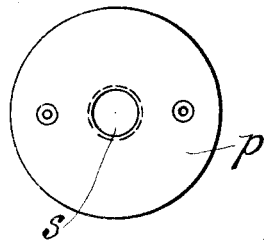
Figure 10:
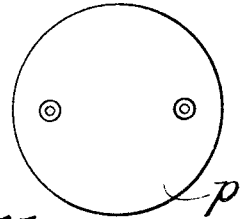
Figure 11:
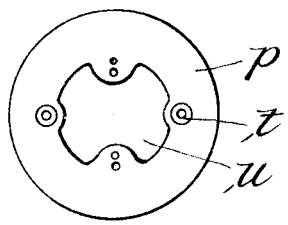

Referring to the drawings forming a part of this invention: Figure 1 is a front elevation showing the outlet box in dotted lines and the extension piece in place; also showing a lamp socket in place. Fig. 2 is a transverse sectional view on the line 2—2 Fig. 1 showing the depending members of the extension piece inserted in place in the neck portion of the outlet box and also illustrating a pipe or conduit connection attached to the outlet box and the wires leading therefrom into the box. This view further shows the different thicknesses of the plastering around the neck of the box. Fig. 3 is a sectional view on the line 3—3 of Fig. 2 showing the shape of the grooves in the depending members of the extension member with the nuts on the bolts in engagement with a shoulder of the outlet box. Fig. 4 is a sectional view showing the extension member in place on the outlet box and the conduit attached thereto. Fig. 5 is a sectional view of a modification which is designed to connect a conduit that is rectangular in cross section and in which the neck portion of the box projects beyond the surface of the plastering. Fig. 6 is a perspective view of the extension piece, clearly illustrating the adjusting screws, the depending members, and the attaching bolts therein. Fig. 7 is a view showing a rosette secured thereto and through which the cords to the lamp pass. Fig. 8 is a sectional view on the line 8—8 of Fig. 7. In Figs. 9, 10, and 11 are detailed views of different forms of plates that are designed to be secured to the extension member, either for permitting a cord to pass from the outlet box, to close the outlet box, or to permit the attachment of any suitable electric attachment as a snap switch, rosette, etc.

Referring to the drawings in detail, $a$ designates an outlet box of the type usually found in practice and is preferably of the kind that are made by stamping from sheet steel having thinned portions to permit the ready insertion of the electric wires. These side portions of the box being preferably thinned or creased to permit the workman to readily knock one of the portions out to obtain an opening for the conduit attachment.

$a^1$ designates attaching ear pieces. This box is provided with a shoulder portion, $b$ and a neck portion $c$. These boxes are secured in place in the building during the construction thereof and attached to the separable member $a^2$ by means of the ears $a^1$. The mason, after the boxes are in place, fills in or plasters around the shoulder $b$ and the neck portion $c$ of the separable member $a^2$ as indicated at $d$. The plastering should of course be left flush with the outer edge $c^1$ of the neck portion $c$ of the separable member $a^2$ of the box but oftentimes it is applied very much thinner as indicated by the dotted line at $e$, or thicker as indicated at $f$. If the plastering is applied too thin around the neck portion $c$ it is necessary to build up around this part of the box before the proper connections for the wires can be made and such building up process produces a piece of work that is unsatisfactory, or if the plastering is too thick then it is necessary to cut away the thickened portion around the neck of the box in order to make the connections. In order to make the connections to the outlet boxes if the plastering shown at $d$ is either too thin or too thick I have designed an attachment known as an extension member which is shown in perspective view in Fig. 6. This extension member comprises a cylindrical portion $g$ that is attached or formed integral with the flanged portion $h$ and extending from the flanged portion $g$ are the grooved depending members $i$ (see Figs. 3 and 6) the outer opposite edges of this grooved portion extending to the outer surface of the cylindrical portion $g$.

The reference letter $j$, in Fig. 6, indicates the line where the outer edge of the groove in the depending member $i$ terminates or merges into the outer surface of the cylindrical surface $g$. The depending portions $i$ are formed with grooves therein, see Fig. 3, to receive the securing bolts $k$ and these grooved portions at the outer ends are beveled as indicated at $m$. The bolts $k$ are made long enough so that the extension member can be secured to the outlet box, no matter what the thickness of the plastering around the neck portion $c$ is, and, it will be noticed from Fig. 3 that the grooves in the depending portions $i$ are so formed that the corners or angular portions of the nuts $n$ engage the bottoms of the grooves as indicated at $n^1$ Fig. 3. This arrangement is for the reason that the diagonal distance between the opposite corners of the nuts is greater than the transverse distance between the side portions, with the result that there is a greater bearing surface of the nuts $n$ on the portion $b$ of the outlet box, thus better securing the extension member to the outlet box. It is, of course, understood that when the extension member is inserted in the outlet box the nuts $n$ are turned or run down toward the lower ends of the bolts $k$ as shown in the dotted lines at the top of Fig. 2. This position of the bolts permits the bolts and the nuts to readily pass through the neck portion $c$, then, by means of a screw driver the bolts $k$ can be rotated and the nuts brought up against the shoulder portion $b$ as shown in Fig. 2. It is obvious from the construction shown in this figure that no matter how thick or thin the plastering $d$ may be the extension piece can be inserted in and attached to the outlet box.

$p$ designates a plate that is designed to be secured to the extension piece and this is accomplished by means of threaded openings $q$ in the depending portions $i$ and the screws $r$ which are inserted therein. This plate permits a lamp socket or other device as a rosette $r^1$ shown in Fig. 8, to be attached thereto after the extension member is in place. Figs. 1, 2, and 3 show a lamp socket $r^2$ attached to the plate $p$. These plates are shown in detail in Figs. 9, 10, and 11. The one in Fig. 9 is for the purpose of permitting the cords for a pendant lamp, for instance, to simply pass through the opening $s$ while the plate in Fig. 10 is merely for closing the outlet box, and the plate in Fig. 11 is designed for the attachment of a lamp socket if desired by means of the threaded openings $t$ through which the screws $r$ pass for securing the plate in place, the opening $u$ therein permitting the usual wires from the box $a$ to pass therethrough.

Referring now to the construction shown in Fig 4 in which is shown devices for attaching the conduit pipe $v$, this conduit contains the wires $v^1$, shown in Fig. 2, and is attached to the extension member on which the depending members $i$ are carried. The extension member in this figure is formed slightly different from that already described, in that the flange $h$ is formed with a second flange $w$ and the cover plate $x$ is used. This cover plate is secured to the depending members $i$ in the same manner as the plate $p$ as indicated by means of the screws $y$. The conduit $v$ passes through an opening 2 and is secured in place by means of the nuts 3 and 4.

Referring now to Fig. 5 where the conduit, instead of being made circular in cross section as shown at $v$ in Fig. 4 is made rectangular as indicated at 5, in this figure the plastering $d$ is supposed to be very thin and the flange $c$ of the outlet box as indicated in dotted lines projects a considerable distance beyond the surface 6 of the plastering and, in order to use the extension piece, shown in detail in Fig. 6, a ring 7 is placed over the neck $c$ and in contact with the surface 6 of the plastering. The extension member is then inserted in the neck $c$ of the outlet box and secured in place by means of the bolts $k$ and the threaded screws 8, which pass through the flange $h$. Thus by tightening the bolts $k$ and the screws 8 the extension member is rigidly secured in place to the outlet box, even if the plastering is thin. The conduit pipe 5 which is of the two part structure in common use is attached to the plate 7 as indicated at 9 and the usual cover 10 over the outlet box is secured to the outlet box by means of the screws 11. Therefore it will be seen that this invention permits the adjustment to an outlet box or conduit construction of both the tubular and the rectangular form, and will at the same time produce a neat appearance without regard to the thickness of the plastering finish about the outlet box.

It will be seen from the above description, and by reference to Figs. 4 and 5, that the conduits $v$ and 5 are always located very close to the plastering without regard to the thickness of the same.

What I claim, is:—

1. An outlet box, comprising an extension piece or member, said member having depending portions and a flanged portion, the depending portions being grooved, a bolt and nut construction located in the groove of each depending portion, the inner ends of the depending portions being inclined and the remainder of the depending portions being parallel with the axis of the extension piece, whereby when the extension piece is inserted through the neck of an outlet box, the same can be secured in place as described.

2. An extension member for insertion in outlet boxes, comprising a flange member, a cylindrical portion, grooved depending members formed with inclined end portions, a bolt located in the grooved members, a nut thereon and designed to engage a part of the outlet box to retain the extension member in place.

3. An extension member for insertion in outlet boxes, comprising a flange member, a cylindrical portion, grooved depending members formed with inclined end portions, a bolt located in the grooved members, a nut thereon and designed to engage a part of the junction box to retain the extension member in place; the flange member having screws therein to effect its adjustment with relation to the outlet box.

4. An extension member for outlet boxes that are formed with a neck portion, comprising grooved depending members that are designed to be located in the neck-portion of the outlet box, a rim or flange portion, set screws therein to engage a ring designed to be placed about the neck portion of the outlet box, whereby when the set screws and bolts are tightened the extension member may be secured to the outlet box.

5. An extension member for outlet boxes that are formed with a neck portion, comprising grooved depending members that are designed to be located in the neck-portion of the outlet box, a rim or flange portion, set screws therein to engage a ring designed to be placed about the neck portion of the outlet box, whereby when the set screws and bolts are tightened the extension member may be secured to the outlet box and means to attach a cover to the ring as described.

6. An extension fitting for electrical outlet boxes comprising a flanged portion, a cylindrical portion, depending members integral with the cylindrical portion and formed with an angular groove having an inclined end portion to receive a bolt and nut construction for attachment to the outlet boxes, and means to attach a conduit to said fitting.

7. An outlet box, comprising, an extension piece or member, said member having depending portions and a flanged portion, the depending portions having grooves formed therein, and means associated with the grooves of the depending portions to secure the extension piece or member to the outlet box.

JAMES C. PHELPS.

Witnesses:
 FRANKLIN G. NEAL,
 HARRY W. BOWEN.